United States Patent Office 3,644,415
Patented Feb. 22, 1972

3,644,415
THIABICYCLONONANES AND PROCESS
Edward D. Weil, Yonkers, and Keith J. Smith, Lockport, N.Y., assignors to Hooker Chemical Corporation, Niagara Falls, N.Y.
No Drawing. Continuation-in-part of abandoned application Ser. No. 482,261, Aug. 24, 1965. This application Aug. 22, 1968, Ser. No. 754,732
Int. Cl. C07d 63/04, 65/04
U.S. Cl. 260—327    12 Claims

ABSTRACT OF THE DISCLOSURE

Beta-substituted 9 - thiabicyclo[3.3.1]nonanes, 9-thiabicyclo[4.2.1]nonanes and the 9-oxides and 9-dioxides thereof are new compounds possessing insecticidal and, fungicidal, nematocidal antibacterial, and herbicidal activities.

---

This application is a contnuation-in-part of our U.S. patent application S.N. 482,261, filed Aug. 24, 1965, now abandoned, which is a continuation-in-part of a patent application filed on Feb. 25, 1963, and identified as U.S. Ser. No. 261,249, now abandoned.

This invention relates to new compositions of matter and to processes of preparation thereof. More particularly, the present invention is concerned with novel bicyclic sulfur-containing organic compounds which are prepared by the reaction of a cyclooctadiene with a sulfur chloride.

The novel compounds of the present invention are best described as β-substituted 9-thiabicyclo[3.3.1]nonanes, 9-thiabicyclo[4.2.1]nonanes, the 9-oxides and 9,9-dioxides thereof. These compounds are represented by the following structure:

wherein $m$ is a number from 0 to 1, $n$ is a number from 0 to 12, $t$ is a number from 0 to 2, and X and X' are substituents separately selected from the group consisting of:
(1) Halogen;
(2) A radical of the formula RZ wherein R is a monovalent radical selected from the group consisting of hydrogen, hydrocarbyl, preferably of 1 to 20 carbon atoms, substituted hydrocarbyl wherein the substituents are preferably halogen, i.e., fluorine, iodine, chlorine or bromine, alkoxy, e.g., of 1–20 carbon atoms, and nitro, and acyl, preferably of 1–20 carbon atoms, substituted acyl, wherein the substituents are those previously recited for substituted hydrocarbyl, and Z is an element of Group VI of the Periodic Table possessing an atomic number of from 8 to 16, inclusive;
(3) A radical of the formula
$$NR^1R^2(R^3)_nY_{(n/v)}$$

wherein $R^1$ and $R^2$ are radicals selected from the group consisting of hydrogen, acyl, substituted acyl, hydrocarbyl, and substituted hydrocarbyl, $R^3$ is a radical selected from the group consisting of hydrogen, hydrocarbyl, and substituted hydrocarbyl, $n$ is a number from 0 to 1, $n$ being 0 when either $R^1$ or $R^2$ is acyl or substituted acyl, and Y is an anion of valence $v$, preferably ammonium, substituted ammonium, preferably hydrocarbyl-substituted, and metal;
(4) A carboxyl radical and the metal, ammonium or substituted ammonium salts, nitrile, hydrocarbyl or substituted hydrocarbyl amides, esters, and acid halides thereof;
(5) A radical of the formula $$-N=C=Z$$

wherein Z is an element of Group VI of the Periodic Table possessing an atomic number of from 8 to 16; and
(6) Aryl, preferably hydrocarbyl or substituted hydrocarbyl of 1–20 carbon atoms. The terms halogen, hydrocarbyl, acyl and substituted derivatives thereof are meant to have the meanings set forth in (2).

The dotted lines in the above formula are intended to designate that one of the bonds connecting the sulfur atom to a ring carbon atom can assume two alternative positions. The substituents X and X' are located on separate carbon atoms each of which is attached to a different bridgehead carbon atom. Another means of designating the positions of X and X' is to state that these substituents are located β and β' to the sulfide sulfur atom, the designations β and β' having their usual significance in organic chemical nomenclature. The 2- or 2-6 substituted[3.3.1] nonanes, oxides and dioxides, and the 7,8 substituted [4.2.1]nonanes are preferred embodiments of the invention.

The novel compounds of the present invention can thus be more specifically represented by the following structures, the position numbering being as indicated:

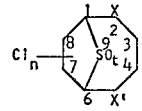 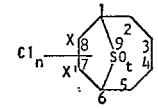 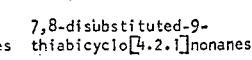

2,6-disubstituted-9-thiabicyclo[3.3.1]nonanes    2,5-disubstituted-9-thiabicyclo[4.2.1]nonanes    7,8-disubstituted-9-thiabicyclo[4.2.1]nonanes

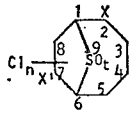 

2,7-disubstituted-9-thiabicyclo[4.2.1]nonanes    2,4-disubstituted-9-thiabicyclo[3.3.1]nonanes The compounds of this invention are prepared by a novel ring-bridging reaction wherein a sulfur chloride, preferably sulfur dichloride, is reacted with a cyclooctadiene, namely 1,5 - cyclooctadiene, 1,4 - cyclooctadiene or 1,3 - cyclooctadiene resulting in the formation of a β, β'-dichloro - 9 - thiabicyclononane. When substituents other than the β,β'-dichloro substituents are to be introduced into the ring, the chlorine atoms located β and β' to the sulfide linkage are subjected to displacement reactions with appropriate nucleophilic reagents, as will be detailed hereinafter. Where the ring is to be further substituted by $n$ chlorines ($n$ greater than 0), these chlorines are introduced by a separate chlorination step, such as liquid phase photocatalyzed chlorination by chlorine gas, using at least $n$ moles of chlorine.

The reaction leading to the compounds of the invention where X and X'=Cl is surprising and unexpected, particularly since the thus formed ring systems are strained.

The reaction of sulfur dichloride with 1,3-cyclooctadiene yields primarily 7,8-dichloro-9-thiabicyclo[4.2.1] nonane. The reaction of sulfur dichloride with 1,4-cyclooctadiene or with 1,5-cyclooctadiene yields products having a degree of structural indeterminacy since the addition can, a priori, occur in either of two directions. When a crystalline product is isolated, said product appears to be a single isomer, yet when the product is dissolved in an ionizing solvent it behaves as an extensively ionized substance. Since it is known that β-chlorosulfides are in equilibrium with a three membered ring sulfonium chloride (see for example, Gundermann, Angewandte Chemie 75, 1194 (1963), it must be concluded that a mobile equilibrium exists of the following type (illustrated for the 1,5-cyclooctadiene adduct):

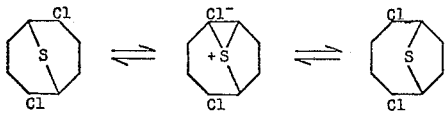

Thus, because of this interconvertibility it is difficult to assign the total product of the 1,5-cyclooctadiene or 1,4-cyclooctadiene addition to one or the other ring system and also difficult to assign the total product of any nucleophilic displacement of the chlorines to one or the other of the two ring systems included within the scope of the invention. However, by infrared spectroscopy, the major products for the reactions of the invention have been assigned definite structures as indicated hereinafter in the examples, but the crude products are believed to contain some of each isomer made possible by the above-described equilibrium.

The 9-oxides or 9,9-dioxides of the invention compounds are prepared by the oxidation of the corresponding sulfides of the invention. In instances wherein the X and/or X' substituents are to be other than chlorine it is generally preferable to introduce the desired X and X' groups into the compound prior to oxidation as the chlorine atoms of the dichloro-9-thiabicyclononane are more labile than the chlorine atoms of the corresponding 9-oxide or 9,9-dioxide. However, the dichloro-9-thiabicyclononane 9-oxide, or 9,9-dioxide can be reacted with more powerful nucleophilic reagents to introduce new X and X' groupings. Illustrative oxidizing agents utilized include hydrogen peroxide, peracetic acid, perbenzoic acid, perphthalic acid or other peroxy organic acids, nitric acid, nitrogen dioxide or tetroxide, permanganates, chromic acid or dichromates, bromic acid or bromates, hypochlorous acid (or chlorine plus water), ozone, or molecular oxygen (preferably using a catalyst such as vanadium oxide, nitrogen oxide, or the like).

The sulfoxide group is also readily formed by introducing one molar equivalent of chlorine or bromine into the sulfide at temperatures below which substitution halogenation occurs and in the absence of substitution catalysts such as actinic light. The resulting S-dihalogen adduct is then hydrolyzed or treated with an organic carboxylic acid in order to replace the two halogen atoms by one oxygen atom, the hydrogen halide also being formed.

The preparation of the β,β'-dichlorothiabicyclononanes of the invention is accomplished by admixing the cyclooctadiene with sulfur dichloride. This is most conveniently done in the liquid phase, although it can also be accomplished in the vapor phase. The reaction is exothermic and, therefore, the reactants should be admixed by slow addition of one to the other, or preferably, of both to a mutual solvent. Suitable solvents are any that are substantially inert to sulfur dichloride and cyclooctadiene. Illustrative examples of suitable solvents include hydrocarbons such as toluene, benzene, hexane, cyclohexane, mineral spirits, chlorocarbons such as carbon tetrachloride, methylene chloride, ethylene dichloride, chloroform, trichloroethylene, perchloroethylene, chlorobenzene, ethers such as diethyl ether, or miscellaneous solvents such as carbon disulfide, thionyl chloride, acetonitrile, acetic anhydride, acetyl chloride, nitromethane, nitrobenzene, dimethyl formamide and others.

The reaction temperature is from between about −40 degrees to about 150 degrees centigrade, however, the preferred range is between about −20 degrees to about 100 degrees centigrade. It is particularly convenient to employ reaction temperatures near ambient temperature, and to cool the reaction by water-jacketing the reactor using water at ambient temperatures, cold water, or cold brine as coolant.

The reaction is rapid and generally is complete within a few seconds to a few hours after the reactants are admixed, depending on temperature. Therefore, a catalyst is not necessary. Nonetheless, if desired, the reaction may be catalyzed by addition of Lewis acids ($FeCl_3$ and the like), iodine, light or peroxides.

While sulfur dichloride is the preferred reactant, sulfur monochloride may be employed to obtain the new dichlorothiabicyclononanes of the invention, however, the use of sulfur monochloride results in a more complex reaction mixture which entails troublesome purification steps. Sulfur tetrachloride may also be used, with resultant formation of some thiabicycloanonane having more than two chlorine atoms per mole. The commercial sulfur dichloride which usually contains some 10 percent to 30 percent of sulfur monochloride is a suitable reagent for the process of the invention.

The dichloro product of the invention is isolated generally by filtration, where a relatively weak solvent has been used, or by evaporating off the solvent, leaving the product as a residue. It may be employed in this technical state of purity, or further purified, most conveniently by recrystallization from a solvent such as those named above as reaction solvents, by sublimation, by vacuum distillation, or other suitable means.

The conversion of the dichloro compounds to derivatives wherein at least one of the X and X' substituents is other than chlorine, is generally accomplished by contacting said dichloro compound with a composition of the formula MX, where X and X' are to be identical substituents, or where X' is to be chlorine and X is to be another substituent other than chlorine. Further, the said dichloro compound can be contacted with MX followed by reaction with MX' where X and X' are to be different substituents. M represents the cationic or relatively positive moiety of a nucleophilic reagent, and the X or X' substituent is as defined herein. Illustrative examples of M include hydrogen, a metal cation, an ammonium cation, a hydrocarbyl-substituted ammonium cation, and the like.

The reaction with MX and/or MX' is generally conducted in a mutual solvent, preferably an ionizing solvent, at a temperature from between about −40 degrees centigrade to about 150 degrees centigrade. Illustrative examples of such solvents include alcohols, such as methanol or ethanol, ketones such as acetone or methyl ethyl ketone, aliphatic acids such as glacial acetic acid, amides such as formamide or dimethylformamide, nitriles such as acetonitrile, nitrohydrocarbons such as nitrobenzene or nitromethane, ethers such as dioxane, tetrahydrofuran, dimethoxyethane or diethyl ether, tertiary amines such as pyridine, and other polar solvents. The displacement of chlorine atoms proceeds least readily in the case of 7,8-dichloro-9-thiabicyclo[4.2.1]nonanes, and extended reaction times up to several weeks may be needed; with the other dichloro-9-thiabicyclononanes of the invention, reaction times of one minute to several days generally suffice, depending on temperature and the nature of the nucleophilic reagents being used. Because of the greater ease of synthesis and the better yields generally obtained, the preferred compounds of the invention are the 2,6-disubstituted-9-thiabicyclo[3.3.1]nonanes and it is to be understood in the following discussion that the species mentioned are preferably of the 2,6-disubstituted-9-thiabicyclo[3.3.1]-nonane structure.

Illustrative examples of compounds of the instant invention wherein X and X' are halogen substituents include the dichloro-, dibromo-, diiodo-, difluoro-, chlorobromo-, chlorofluoro-, chloroiodo-, and bromofluoro-9-thiabicyclononanes. The compounds (other than the dichloro-) are prepared from the dichloro-9-thiabicyclononane, for example, by reaction with hydrogen bromide to introduce bromine in place of chlorine, or by reaction of an iodide or fluoride salt (such as sodium iodide, potassium iodide, potassium fluoride, or sodium fluoride) to introduce iodine or fluorine in place of chlorine or bromine. Either one or two molar equivalents of the halogen-replacing reagent may be used, depending on whether one or two halogens are to be replaced.

Examples of compounds wherein m equals zero include chloro-9-thiabicyclononane, methoxy-9-thiabicyclononane, phenyl-9-thiabicyclononane, and carboxy-9-thiabicyclononane. These compounds may conveniently be prepared from the corresponding compounds wherein X and/or X' is chlorine, by treatment with an agent capable of producing hydrogenolysis of chlorine, such as a metal hydride (LiAlH$_4$ for example), a metal plus a hydroxylic solvent (such as zinc and aqueous hydrochloric acid or magnesium in ether followed by addition of water), or hydrogen gas plus a catalyst (such as palladium).

The compounds of the present invention wherein the X and/or X' substituents are selected from the group consisting of hydroxy, mercapto, hydrocarbyloxy, hydrocarbylmercapto, acyloxy, and acylmercapto may be generically designated as those compounds wherein X and/or X' represents a radical RZ where R is a monovalent radical selected from the group consisting of hydrogen, acyl, substituted acyl, hydrocarbyl and substituted hydrocarbyl radicals, where Z is an element of Group VI of the Periodic Table, possessing an atomic number of from 8 to 16, as for example oxygen and sulfur. In general, these compounds may be made by treating the β-halo-9-thiabicyclononane with a nucleophilic reagent RZM where M represents the cationic moiety (i.e., the relatively electropositive radical or element) of the reagent.

Certain substituents of the type RZ can be designated by the formula

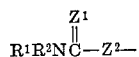

wherein R$^1$ and R$^2$ substituents are selected from the group consisting of hydrocarbyl and hydrogen and the Z$^1$ and Z$^2$ substituents are elements selected from Group VI of the Periodic Table having an atomic number of from 8 to 16, inclusive, or likewise RZ can comprise:

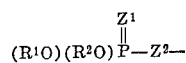

wherein the R$^1$ and R$^2$ substituents are lower alkyl and Z$^1$ and Z$^2$ are elements selected from Group VI of the Periodic Table having an atomic number of from 8 to 16, inclusive.

Illustrative examples of compounds wherein X and/or X' represent hydrocarbyloxy include aliphatic hydrocarbyloxy compounds such as chloromethoxy-, dimethoxy-, chlorobutoxy-, dibutoxy-, dicyclohexyloxy-, chloropentadecyloxy-, di(pentadecyloxy)-, polyoxyethylenoxy-, pentadecyloxy, allyloxychloro-, di(allyloxy)-, di(propargyloxy)-, di(2-chloroethoxy)-, di(polyethyleneoxy)-, (2-hydroxyethoxy) chloro-, di(2-hydroxyethoxy)-, di(benzyloxy)-, di(2-phenylethoxy)-, and di(ethoxyethoxy)-9-thiabicyclononane, for example. These compounds may be readily prepared from dichloro-9-thiabicyclononane by reaction with the corresponding alcohol preferably in the presence of a base such as caustic potash, soda ash, or sodium metal (dissolved in the alcohol to form the alkoxide), employing one mole of base when only one chlorine atom is to be replaced, and two or more moles of base when both chlorine atoms are to be replaced. Two different alcohols may be used, replacing the chlorine step-wise, if desired.

Examples of compounds where X and/or X' substituents are hydrocarbyloxy also include aryloxy compounds such as phenoxychloro-,
di(phenoxy)-,
di(cresoxy)-,
di(chlorophenoxy)-,
(chlorophenoxy)chloro-,
phenoxymethoxy-,
di(2,4-dichlorophenoxy)-,
(2,4-dichlorophenoxy)chloro-,
di(2,4,5-trichlorophenoxy)-,
2,4,5-trichlorophenoxy)chloro-,
di(pentachlorophenoxy)-,
(p-nitrophenoxy)chloro-,
di(p-nitrophenoxy)-,
p-nitrophenoxy-2',
4'-dichlorophenoxy-,
(2,4-dinitro-sec-butylphenoxy)chloro-,
(nonylphenoxy)chloro-,
(nonylphenoxy)(polyoxyethyleneoxy)-,
phenoxy-bromo-,
(2,4-dichlorophenoxy)carboxy-, and
(2,4-dichlorophenoxy)hydroxy-9-thiabicyclononane.

In general, these compounds may be made by reacting a chloro-9-thiabicyclononane or a dichloro-(or dihalo)-9-thiabicyclononane with one or two molar equivalents of a salt (such as the sodium salt) of the phenols corresponding to the phenoxy groups to be introduced.

Examples of compounds of the invention where X and/or X' substituents are hydroxy include hydroxychloro-, hydroxymethoxy-, hydroxybromo-, hydroxycyano-, hydroxyacetoxy-, and dihydroxy - 9 - thiabicyclononanes. In general, these can be made by treating the corresponding chloro- or dichloro - 9 - thiabicyclononane with a metal hydroxide such as sodium hydroxide or potassium hydroxide, or water (preferably with a base such as sodium carbonate or bicarbonate), or by saponification of a corresponding acyloxy-9-thiabicyclononane.

Examples of compounds of the invention where the X and/or X' substituents are alkylmercapto or arylmercapto include methylmercaptochloro-,
di(methylmercapto)-,
di(butylmercapto)-,
di-laurylmercapto)-,
di(allylmercapto)-,
di(t-butylmercapto)-,
phenylmercaptochloro-,
di(phenylmercapto)-,
di(chlorophenylmercapto)-,
di(furfurylmercapto)-,
di(naphthylmercapto)-,
di(benzothiazolylmercapto)-,
(phenylmercapto)methoxy-,
di(pyridylmercapto)-,
di(hydroxyethylmercapto)-, and
di(chlorobenzylmercapto)-9-thiabicyclononane.

These products are made by reaction of the corresponding chloro- or dichloro-9-thiabicyclononane with a salt (such as a sodium salt) of the appropriate mercaptan.

Examples of compounds of the invention wherein X and/or X' equals mercapto include mercaptochloro-, mercaptohydroxy-, mercaptoacetoxy-, and dimercapto-9-thiabicyclononane. These may be prepared by reaction of the corresponding chloro-, or dichloro-9-thiabicyclononane with a hydrosulfide such as sodium or potassium hydrosulfide. They may also be prepared by saponification of an acylmercapto- or di(acylmercapto)-9-thiabicyclononane, preparation of which is given below.

Compounds of the invention in which the X and/or X' substituents are acylmercapto include, for example, acetylmercaptochloro-,
di(acetylmercapto)-,
di(benzoylmercapto)-,
di(furoylmercapto)-,
di(thiobenzoylmercapto)-,
di(ethoxythiocarbonylmercapto)-,
di(xanthoylmercapto)-,
thiocyano-,
di(N,N-dimethylthiocarbamylmercapto)-,
di(N-methylthiocarbamylmercapto)-,
di(N,N-diethylthiocarbamylmercapto)-,
(N,N-diethylthiocarbamylmercapto)chloro-,
(N,N-diethylcarbamylmercapto)methoxy-,
(N,N-dibutylthiocarbamylmercapto)chloro-,
di(N,N-dibutylthiocarbamylmercapto)-,
di(N,N-diisopropylthiocarbamylmercapto)-,
methylsulfonylmercapto-,
chloro-,
di(methylsulfonylmercapto)-,
di(sulfomercapto)-(sodium salt, i.e., the "Bunte Salt") and
(sodium sulfomercapto)chloro-9-thiabicyclononane.

Also included under the general term acylmercapto-9-thiabicyclononanes are phosphorylated mercapto-9-thiabicyclononanes such as bis(di-lower-alkoxyphosphinylthio)-,
bis(diethoxyphosphinylthio)-,
bis(dimethoxyphosphinylthio)-,
bis(dimethoxyphosphinothioylthio)-,
bis(diethoxyphosphinothioylthio)-,
(diethoxyphosphinothioylthio)chloro-,
(dimethoxyphosphinothioylthio)methoxy-,
(diethoxyphosphinylthio)methoxy-,
(diethoxyphosphinothioylthio)methylmercapto-,
bis(methoxymethanephosphonylthio)-,
bis(methoxymethanephosphonothioylthio)-,
bis(dimethylphosphinylthio)-,
bis(P-methyl-N-methylaminophosphinylthio)-, and
bis(N,N,N',N'-tetramethyldiaminophosphinothioylthio)-, and the 9-oxides and 9,9-dioxides thereof.

In general, all acylmercapto- and diacylmercapto-9-thiabicyclononanes may be prepared by reaction of the corresponding chloro- or dichloro - 9 - thiabicyclononane with a salt (such as sodium, potassium, ammonium, or amine salt) of the desired thiol acid, or with the acid itself. They may also be prepared by acylating the corresponding mercapto- or dimercapto-9-thiabicyclononane or salt thereof, by means of an acyl halide or acyl anhydride.

The compounds of the invention where X and/or X' substituents are acyloxy include acetoxycloro-,
diacetoxy-,
distearyloxy-,
lauroxypolyoxyethyleneoxy-,
stearyloxy(trimethylammonium chloride)-,
benzoyloxy-,
di(2,4-dichlorophenoxyacetoxy)-,
di(chloroacetoxy)-,
di(trichloroacetoxy)-,
di(α,α-dichloropropionoxy)-,
di(carbamyloxy)-,
di(N-methylcarbamyloxy)-,
di(N-phenylcarbamyloxy)-,
di(acryloxy)-,
di(methacryloxy)-,
di(adipoyloxy)-,
di(phthaloyloxy)-,
di(methylsulfonyloxy)-,
bis(lower-alkoxyphosphinyloxy)-,
bis(dimethoxyphosphinyloxy)-,
bis(diethoxyphosphinyloxy)-,
bis(dimethoxyphosphinothioyloxy)-,
bis(diethoxyphosphinothioyloxy)-,
di(sulfato)-,
i.e., di($HOSO_2$—O—)- and alkali metal salts thereof,
di(sodium xanthyloxy)-, i.e., di(NaS—CS—O—)-9-thiabicyclononane,
di(N,N-di-lower alkyl-carbamyloxy)-,
di(N,N-di-lower alkyl-thiocarbamyloxy)-, and
di(N,N-diethylthiocarbamyloxy), for example.

In general, these compounds can be prepared by acylation of the corresponding hydroxy- and dihydroxy-9-thiabicyclononanes, using the acyl chloride, acid anhydride, or free acid corresponding to the acyl group to be introduced, or by displacement of halogen by acylate anion, or by solvolysis of the dihalo-9-thiabicyclononane in the acid corresponding to the desired acyloxy groups.

The compounds of the present invention where X and/or X' equals cyano, hydrocarbyl-substituted carboxy, carbometalloxy, and carbamido may all be considered derivatives of the compounds where X and/or X' equals carboxy, i.e., the nitriles, esters, salts, and amides of the acids.

The compounds of the present invention wherein the X and/or X' substituents are cyano include cyanochloro-, dicyano-, cyano(methoxy)-, cyanohydroxy- phenylcyano-, cyano(diethoxyphosphinothioylthio)-, and cyano (N,N-diethylthiocarbamylmercapto) - 9 - thiabicyclononane, to name only a few. In general, these compounds are made by treating the corresponding chloro- or dichloro-9-thiabicyclononane with a metal cyanide, such as sodium, potassium, or cuprous cyanide, or with hydrocyanic acid itself.

The compounds of the present invention wherein the X and/or X' substituents are carboxy, substituted carboxy, or carbamido include chlorocarboxy-, dicarboxy-, methoxycarboxy-, (2,4-dichlorophenoxy)carboxy-, chloro(carbomethoxy)-, dicarbomethoxy-, dicarbobutoxy-, dicarbophenoxy, dicarbolauroxy-, dicarboallyloxy-, chloro(carbamido)-, dicarbamido-, di(N-methylcarbamido)-, di(N,N - diethylcarbamido)-, N-methylcarbamido(dimethoxythiophosphinylthio)-, cyanocarbamido-, thiocyano(carbamido)-, and hydroxycarboxy-9-thiabicyclononanes, to name only a few represenative examples. In general, these compounds can be prepared by hydrolysis of the corresponding cyano compounds to the acid by, for example, aqueous sulfuric or hydrochloric acid, partial hydrolysis to the amide by, for example, concentrated sulfuric acid or strong caustic soda, or alcoholysis to the ester by, for example, alcohol plus hydrochloric or sulfuric acid. It is also possible to convert the compounds wherein X and/or X' equals carboxyl to corresponding compounds wherein X and/or X' equals carbalkoxy, carboaryloxy, or carbamido by reaction with an acid-chloride-forming reagent ($SOCl_2$ or $PCl_3$, for example) followed by alcoholysis or aminolysis of the acid chloride. Furthermore, the compounds where X and/or X' are carboxyl may be reacted with bases to form carbometalloxy compounds (i.e., salts) for example, the sodium salt, by reaction with caustic soda, the ammonium salt by reaction with ammonia, the triethylammonium, zinc, copper, barium, lead, and other salts. Acid anhydrides, thiolesters, thioanhydrides, and thioamides may also be made from the acids, nitriles, and acid chlorides by methods in themselves known.

Compounds of the invention wherein the X and/or X' substituents are isothiocyano include chloroisothiocyano-, hydroxyisothiocyano-, methoxyisothiocyano-, carboxyisothiocyano, dimethylaminoisothiocyano-, mercaptoisothiocyano-, and diisothiocyano - 9-thiabicyclononanes, for example. These compounds may be made by reaction of the corresponding chloro- or dichloro - 9-thiabicyclononane with a thiocyanate salt such as sodium, potassium, or ammonium thiocyanate. In like manner the corresponding isocyanates are made using the corresponding cyanate salts.

Also within the scope of the invention are β-substituted 9-thiabicyclononanes wherein X and/or X' represent an amino or hydrocarbyl-substituted amino radical $$R^1R^2N(R^3)_n$$

$Y_{(n/v)}$, where $R^1$ and $R^2$ are chosen from the group consisting of hydrogen, acyl, and hydrocarbyl, and where $R^3$ is chosen from hydrogen and hydrocarbyl, and where $n$ represents an integer from 0 to 1. When $n$ is 1, the products are obviously positively charged ammonium compounds which must be accompanied by $(n/v)$ molar equivalent of an anion Y of valence $v$ to maintain electrical neutrality. Representative anions Y include halide, sulfate, acetate, nitrate, and phosphate. In general, this group of compounds is made by contacting a β-halo-9-thiabicyclononane with an amine $R^1R^2NH_{1-n}(R^3)_n$ until the halogen is released as halide anion, or where $R^1$ or $R^2$ is acyl, by treating the corresponding compound having H at the intended site of said acyl with an acylating agent.

Compounds of the invention wherein the X and/or X' substituents are amino or substituted amino thus include, for example, diamino-,
di(methylamino)-,
bis(dimethylamino)-,
bis(trimethylammonium)-(dichloride)-,
di(cyclohexylamino)-,
di(laurylamino)-,
di(allylamino)-,
di(2-hydroxyethylamino)-,
di(piperidino)-,
di(morpholino)-,
di(anilino)-,
di(p-chloroanilino)-,
di(p-nitroanilino)-,
di(α-naphthylamino)-,
di(N-methylanilino)-,
aminodiethylamino-,
(dimethylamino)(p-chloroanilino)-,
aminochloro-,
aminohydroxy-,
aminocarboxy-,
di(N-pyridino)(dichloride),
di(dimethyllaurylammonium)(dichloride)-, and
di(2-dimethylaminoethylamino)-9-thiabicyclononane,
iminobis (amino-9-thiabicyclononane), and the hydrohalides and other salts of the above listed primary, secondary, and tertiary amines. These compounds are prepared by reaction of the corresponding chloro- or dichloro-9-thiabicyclononane with ammonia or the amine corresponding to the amino group(s) to be introduced. The reaction can, if desired, be done in two steps to introduce two different amino groups. The primary and secondary amines thus made may subsequently be acylated to produce acylamino-9-thiabicyclononanes, such as di(acetamido)-, and (N,N-dimethylcarbamino)-9-thiabicyclononane.

When an ammonia or a primary amine is employed, using three moles thereof, or, better, one mole plus one or two moles of an acid acceptor (for instance, 2,6-lutidine, soda ash, or di-t-butylamine) per mole of 2,6-dichloro-9-thiabicyclo[3.3.1]nonane, it is thereby possible to synthesize certain novel polycyclic heterocyclic systems believed to have the structure:

In these structures, $R^2$ may be considered as the β'-position of the 9-thiabicyclononyl radical to which the $R^1N—$ group is also attached at the β-position.

Certain of the compounds where the X and/or X' substituents are acylamido can be conveniently prepared from the composition of the present invention wherein X and/or X' substituents are isothiocyano. Examples of such compounds include bis(acetamido)-9-thiabicyclononane (from diisothio-ciano-9-thiabicyclononane and acetic acid),
$C_8H_{12}S(NHCS-OCH_3)_2$ and $C_8H_{12}S(NCS-OCH)$ (from methanol and diisothiocyano-9-thiabicyclononane);
$C_8H_{12}S(NH-CS-SC_2H_5)_2$ (from $C_2H_5SH$ and diisothiocyano-9-thiabicyclononane),
$C_8H_{12}S(NH-CS-SC_4H_{9-n})_2$ (from n-butylmercaptan and diisothiocyano-9-thiabicyclononane),
$C_8H_{12}S(NH-CS-SNa)_2$ (from NaHS and diisothiocyano-9-thiabicyclononane), also the zinc, iron, potassium and manganese salts thereof, $C_8H_{12}S(NH-CS-NH_2)_2$ from ammonia and diisothiocyano-9-thiabicyclononane,
$C_8H_{12}S(NHCSNHCH_3)_2$ (from methylamine and diisothiocyano-9-thiabicyclononane),
$C_8H_{12}S(NHCSN(CH_3)_2)_2$ (from dimethylamine and diisothiocyano-9-thiabicyclononane), and in general $C_8H_{12}S(NH-CS-ZR)_2$,
$C_8H_{12}XS(NHCS-ZR)$,
$C_8H_{13}S(NHCS-ZR)$,
$C_8H_{12}S(NHCS-NR^1R^2)_2$
and $C_8H_{12}XS(NH-CS-NR^1R^2)$ where R, $R^1$, and $R^2$ and Z are as heretofore defined, and where $C_8H_{12}S$ is the 9-thiabicyclononane nucleus.

Novel compounds of the present invention wherein the X and/or X' substituents are aryl include phenylchloro-, phenylhydroxy-, phenylcyano-, phenylmethoxy-, phenyl (chlorophenyl)-, diphenyl-, di(chlorophenyl)-, di(dichlorophenyl)-, di(trichlorophenyl)-, (chlorophenyl)-, (trichlorophenyl)-, ditolyl-, dixylyl-, naphthylchloro-, di-1-naphthyl-, di-9-anthracyl-, diethenyl-, difuryl-, di(xenyl)-, di(phenoxyphenyl)-, di(hydroxyphenyl)-, and (dodecylphenyl)(polyoxyethyleneoxy)-9-thiabicyclononane, for example. These compounds are generally prepared by the Friedel-Crafts reaction of dichloro-9-thiabicyclononane with the aromatic hydrocarbon (or substituted aromatic hydrocarbon) corresponding to the aryl group to be introduced, using a Lewis acid catalyst such as $AlCl_3$, $FeCl_3$, $BF_3$, $ZnCl_2$, $SnCl_4$, or the like. Where one aryl is to be introduced, the reaction is stopped short (when only one mole of HCl has been evolved), or an excess of the dichloro-9-thiabicyclononane is used. Where two like aryl groups are to be introduced, an excess of the hydrocarbon may conveniently be used and the reaction allowed to proceed to completion. A second substituent (X'), either a different aryl group or any other of the above-described substituent groups may be introduced by any of the above-described reactions performed on a 9-thiabicyclononane in which X is aryl and X' is chlorine.

A further valuable reaction of the 2,6-dihalo-9-thiabicyclo[3.3.1]-nonanes of the invention is their conversion by thermal dehydrohalogenation to 6-halo-9-thiabicyclo[3.3.1]-2-nonenes which have the useful properties and reactivities of an active halogen compound, and are described in our copending application S.N. 482,297, filed on even date with S.N. 482,261. Compounds of the present invention can be produced via the aforementioned 6-halo-9-thiabicyclo[3.3.1]-2-nonenes and their nucleophilic displacement products and 9-oxides and 9,9-dioxides thereof by addition of hydrogen, or halogen, to the double bond.

It is to be understood that all of the many compounds described above may be converted by oxidation as hereinabove described to the corresponding sulfoxide and sulfones.

Further, it is to be understood in the preceding discussion that there is no upper limit to the size of hydrocarbyl or acyl groups which may serve as components of the X and X' groups. For economic reasons, however, groups of twenty carbon atoms or less are preferred where said hydrocarbyl or acyl groups are monovalent. In specific instances, when "lower alkyl" is stated herein, alkyl groups of six carbon atoms or less is meant.

In the examples, specification and claims that follow, the term "parts" signifies parts by weight unless otherwise stated and all temperatures are in degrees centigrade unless otherwise stated.

To further make clear the reactions encompassed by the invention in its process aspects, and the compounds and their utilities encompassed by the invention, the following examples, which are not intended to be limiting, are given.

EXAMPLE 1

2,6-ichloro-9-thiabicyclo[3.3.1]nonane

From separate funnels, 8880 milliliters (72 moles) of 1,5-cyclooctadiene and 4596 milliliters (72 moles, calculated on an assumed 100 percent purity) of commercial sulfur dichloride (71 percent $SCl_2$, remainder mostly $S_2Cl_2$) were added at constant 2:1 volume ratio to 9 liters of methylene chloride stirred at —5 degrees centigrade to 0 degrees centigrade (Dry Ice bath cooling) over 5 hours. The reaction mixture was allowed to warm to room temperature over 12 hours, warmed to 50 degrees centigrade to dissolve all solids, then cooled and filtered. The solids thus obtained were washed with hexane and dried in air to obtain 7531 grams (50 percent yield) of nearly colorless solid, melting point 100–101 degrees centigrade. A further recovery of 2093 grams of the same product could be obtained by further concentrating the filtrate, collecting the solids, and recrystallizing these from methylene chloride, to obtain a total yield of 63 percent. By further concentrating the mother liquors, less pure crops were obtained which were worked up by addition to the reaction mixture of subsequent runs; in this way, an overall yield of 68 percent of product, melting point 100–101 degrees centigrade, was obtained over a series of three similar runs. The analytical sample, purified by repeated recrystallizations from benzene, melted at 101–102 degrees centigrade. The infrared spectrum (Nujol mull) showed bands at 1378 (s.), 1354 (w.), 1337 (m.), 1280 (w.), 1266 (m.), 1239 (m.s.), 1202 (m.), 1162( s.), 1092 (m.), 1080 (m.), 1073 (m.), 1000 (m.), 953 (m.), 887 (m.), 859 (m.s.), 816 (v.s.), 757 (m.), 737 (v.s.), 712 (m.w.), 686 (s.), 624 (s.), and 468 cm.$^{-1}$ (m.).

*Analysis.*—Calculated for $C_8H_{12}Cl_2S$ (percent): C, 45.50; H, 5.73; Cl, 33.58; S, 15.18 (molecular weight 211). Found (percent): C, 45.10; H, 5.78; Cl, 33.6; S, 15.05 (molecular weight 226 (±10 percent; cryoscopic in benzene)).

EXAMPLE 2

2,6-dichloro-9-thiabicyclo[3.3.1]nonane 9-oxide

To a solution of 422 parts of 2,6-dichloro-9-thiabicyclo-[3.3.1]nonane in 100 parts by volume of glacial acetic acid were added dropwise 23 parts by volume of 30 percent hydrogen peroxide with cooling and stirring at 25 degrees centigrade. After one hour at 25 degrees centigrade, the temperature was raised to 50 degrees centigrade for 15 minutes, then the mixture was diluted with water, causing an oil to precipitate. The organic product was extracted with chloroform which was washed with water and then evaporated. The residue was recrystallized from a benzene-heptane mixture to obtain a crystalline solid, melting point 122–123 degrees centigrade. The infrared spectrum was found to have bands characteristic of the sulfoxide group.

EXAMPLE 3

2,6-dichloro-9-thiabicyclo[3.3.1]nonane 9,9-dioxide

To a solution of 211 parts of dichloro-9-thiabicyclono- nane in 1000 parts by volume of glacial acetic acid was slowly added 253 parts by volume of 30 percent hydrogen peroxide with cooling and stirring. The temperature was then raised gradually to 93 degrees centigrade over a period of 2.5 hours. Upon cooling of the reaction mixture, 134 parts of crystalline sulfone, melting point 175–176 degrees centigrade, came out of solution and was isolated by filtration. Further portions of the less pure sulfone were isolated by partial evaporation of the solvent.

*Analysis.*—Calculated for $C_8H_{12}SO_2Cl_2$ (percent): Cl, 29.2; S, 13.2. Found (percent): Cl, 29.2; S, 13.13.

EXAMPLE 4

2,6-dichloro-9-thiabicyclo[3.3.1]nonane 9,9-dichloride and 9-oxide

Into a solution of 34 parts of dichloro-9-thiabicyclo-nonane in 150 parts by volume of carbon tetrachloride is passed a stream of chlorine gas. After 15 minutes, the precipitated yellow solid is removed by filtration.

On 10 hours exposure of the solid to moist air, two molar equivalents of hydrogen chloride are given off and the residue is found to be the sulfoxide, melting point 123 to 124 degrees centigrade (after recrystallization from heptane).

*Analysis.*—Calculated for $C_8H_{12}SOCl_2$ (percent): Cl, 31.2. Found (percent): Cl, 31.0.

EXAMPLE 5

2,6-dibromo-9-thiabicyclo[3.3.1]nonane

A solution of 21.1 grams (0.1 mole) of 2,6-dichloro-9-thiabicyclo[3.3.1]nonane in 100 milliliters of glacial acetic acetic acid was saturated with hydrogen bromide gas, then allowed to stand overnight in a closed container. The solution was then poured into water, the precipitate filtered, washed, dried in vacuum, and recrystallized from benzene-heptane to obtain 20 grams (67 percent yield of product) of colorless prisms, melting point 134.5–135.5 degrees centigrade.

*Analysis.*—Calculated for $C_8H_{12}SBr_2$ (percent): C, 32.02; H, 4.03; Br, 53.27; S, 10.68. Found (percent): C, 32.90; H, 4.04; Br, 53.1; S, 10.86.

EXAMPLE 6

2,6-diiodo-9-thiabicyclo[3.3.1]nonane

A mixture of 10 grams (0.05 mole) of 2,6-dichloro-9-thiabicyclo[3.3.1]nonane and 25 grams (0.20 mole) of sodium iodide in 300 milliliters of acetone was stirred for 3 hours at room temperature, filtered to remove salt, and the filtrate evaporated to dryness. The residue was digested with hot heptane, filtered, and the filtrate on cooling gave 14 grams (71 percent yield of product) of colorless crystals, melting point 139.5–140 degrees centigrade. Recrystallization from heptane-benzene (90 percent recovery) raised the melting point to 145–146 degrees centigrade.

*Analysis.*—Calculated for $C_8H_{12}SI_2$ (percent): C, 24.38; H, 3.07; I, 64.4; S, 8.14. Found (percent): C, 25.24; H, 2.97; I, 63.8; S, 8.07.

EXAMPLE 7

2,6-difluoro-9-thiabicyclo[3.3.1]nonane 42.2 parts of dichloro-9-thiabicyclononane and 50 parts of potassium fluoride were heated in 400 parts of dimethylformamide for 18 hours at 120 degrees centigrade. The solution was then concentrated to one half volume and cooled to precipitate the product, which was then recrystallized from benzene to obtain 12 parts of colorless solid, melting point 159 to 166 degrees centigrade (decomposes).

*Analysis.*—Calculated for $C_8H_{12}SF_2$ (percent): Cl, 0.00; S, 18.00. Found (percent): Cl, 0.00; S, 18.17.

EXAMPLE 8

7,8-dichloro-9-thiabicyclo[4.2.1]nonane

From separate funnels 108 grams (1 mole) of 1,3-cyclooctadiene and 103 grams of sulfur dichloride were added with stirring to 5 liters of benzene at 25–26 degrees centigrade (water bath cooling) over 7 hours. The reaction mixture was allowed to stand for 10 hours, then the benzene was distilled off leaving 200 grams of brown syrup which was subjected to short path distillation at 7 microns of mercury to obtain 28 grams of volatile liquid (collected in the Dry Ice-cooled trap and found by infrared to contain 1,3-cyclooctadiene) and 50 grams of a waxy solid distillate, the residue being a tar undistillable up to a stillpot temperature of 130 degrees centigrade. The solid distillate melted at 155–168 degrees centigrade and was found by infrared to be greater than 90 percent by comparison to the purified sample obtained by recrystallization from hexane (50 percent recovery); the purified product was a colorless crystalline solid, melting point 185.5–186.5 degrees centigrade. The infrared spectrum (Nujol mull) showed bands at 1286 (w.), 1258 (m.), 1242 (m.), 1166 (m.), 1123 (m.w.), 1111 (m.w.), 1079 (m.), 1070 (m.), 982 (m.s.), 972 (m.s.), 955 (m.), 861 (v.s.), 823 (m.), 776 (s.), 749 (s.), 718 (s.), 692 (w.), 656 (m.s.), 622 (m.s.), 602 (s.), 514 (w.), and 420 cm.$^{-1}$ (m.).

*Analysis.*—Calculated for $C_8H_{12}Cl_2S$ (percent): C, 45.50; H, 5.73; Cl, 33.58; S, 15.18 (molecular weight 211.1). Found (percent): C, 45.36; H, 5.85; Cl, 33.59; S, 15.02 (molecular weight 217 ($\pm 5$ percent)).

EXAMPLE 9

7,8-dichloro-9-thiabicyclo[4.2.1]nonane 9,9-dioxide

A solution of 18 grams (0.085 mole) of 7,8-dichloro-9-thiabicyclo[4.2.1]nonane and 30 milliliters of 30 percent hydrogen peroxide in 100 milliliters of glacial acetic acid was heated for 3 hours on the steam bath, 30 milliliters more hydrogen peroxide added, then heated overnight on the steam bath, cooled, and filtered to obtain 17.5 grams (84 percent yield of product) of colorless crystals, melting point 264 degrees centigrade (decomposes).

*Analysis.*—Calculated for $C_8H_{12}O_2Cl_2S$ (percent): C, 39.52; H, 4.97; Cl, 29.15; S, 13.19. Found (percent): C, 39.96; H, 5.05; Cl, 28.9; S, 13.26.

EXAMPLE 10

9-thiabicyclo[3.3.1]nonane-2,6-diol

A mixture of 21.1 grams (0.1 mole) of 2,6-dichloro-9-thiabicyclo[3.3.1]nonane, 100 milliliters of 10 percent aqueous sodium hydroxide and 100 milliliters of ethylene glycol dimethyl ether was refluxed for 19 hours. Upon cooling, two layers were observed. Volhard titration of aliquots indicated 53 milliequivalents of chloride in the upper (organic) layer and 131 milliequivalents of chloride in the lower (aqueous) layer. The mixture was evaporated to dryness under aspirator vacuum on the steam bath and the resultant cake extracted with two 250 milliliter portions of hot benzene. On cooling, the benzene deposited 2 grams of colorless solids, melting point 250.5–251.5 degrees centigrade. The undissolved solids were then leached with 200 milliliters of water which left undissolved 13 grams of micro-crystalline colorless solid, melting point 249–250.5 degrees centigrade. The infrared spectra of both solids in Nujol mull were substantially identical; total yield, 86 percent. The infrared spectrum of a saturated solution in carbon tetrachloride (less than $10^{-2}$ molar) showed only a single sharp band at 3622 cm.$^{-1}$ in the OH stretching region.

*Analysis.*—Calculated for $C_8H_{14}O_2S$ (percent): S, 18.40. Found (percent): S, 18.20.

Recrystallization from hot water and vacuum drying of the product at 100 degrees centigrade depressed the melting point to 226–228 degrees centigrade.

EXAMPLE 11

9-thiabicyclo[3.3.1]nonane-2,6-diol 9,9-dioxide

To 8.7 parts of 9-thiabicyclo[3.3.1]nonane-2,6-diol and 100 parts by volume of acetic acid is added 13 parts by volume of 30 percent hydrogen peroxide at 25 to 33 degrees centigrade. Then the reaction mixture is heated slowly to 100 degrees centigrade, cooled and partly evaporated, and the precipitated crystals are recrystallized from methanol-butyl acetate to obtain a crystalline water-soluble solid, melting point above 300 degrees centigrade.

*Analysis.*—Calculated for $C_8H_{14}SO_2(OH)$ (percent): S, 15.5. Found (percent): S, 15.4.

EXAMPLE 12

2,6-di(2-hydroxyethoxy)-9-thiabicyclo[3.3.1]nonane 22.4 parts of potassium hydroxide and 500 parts by volume of ethylene glycol were heated to reflux to drive off water and thus to form the potassium salt of the glycol. The solution was cooled, 21.1 parts of dichloro-9-thiabicyclononane added, and then again refluxed briefly. After cooling, the glycol was stripped off to 100 degrees centigrade (0.2 millimeter), then water was added, causing separation of the organic product as a viscous oil, established to be the desired diol by alcohol number determination.

EXAMPLE 13

2,6-di(2-hydroxyethoxy)-9-thiabicyclo-[3.3.1]nonane 9,9-dioxide 24.3 parts of 2,6-dichloro-9-thiabicyclo[3.3.1]nonane 9,9 - dioxide, 22.4 parts of potassium hydroxide and 500 parts by volume of ethylene glycol were heated at reflux for 3 hours. The glycol was then stripped off under 0.4 millimeter vacuum to leave a dry residue which was then dissolved in 500 parts of water. This solution on concentration deposited potassium chloride. The last traces of potassium chloride were removed as a precipitate by addition of methanol and hydrochloric acid, followed by filtration. Evaporation of the filtrate and washing of the residue with acetone yielded 15.5 parts of colorless crystalline solid, soluble in water, insoluble in acetone, melting point 133 to 134 degrees centigrade.

*Analysis.*—Calculated for $C_8H_{12}SO_2(OC_2H_4OH)_2$ (percent): S, 10.9; Cl, 0.0. Found (percent): S, 10.2; Cl, 0.0.

EXAMPLE 14

2,6-dimethoxy-9-thiabicyclo[3.3.1]nonane

A solution of 106.5 grams (0.5 mole) of the product of Example 1 and 108 grams (2 moles) of sodium methylate in 700 milliliters of methanol was heated briefly on the steam bath after the initial reaction exotherm subsided, diluted with water and extracted with hexane. The hexane solution was washed with water and fractionally distilled to obtain 54 grams (53 percent) of product as a pale yellow oil, boiling point 145–147 degrees centigrade (11 millimeters), $N_{25}^D$ 1.5195.

*Analysis.*—Calculated for $C_{10}H_{18}O_2S$ (percent): S, 15.85. Found (percent): S, 15.52.

EXAMPLE 15

2,6-diethoxy-9-thiabicyclo[3.3.1]nonane (a) By ethanolysis: A solution of 10 grams (0.047 mole) of 2,6 - dichloro - 9 - thiabicyclo[3.3.1]nonane in 200 milliliters of ethanol was refluxed for 17 days, then evaporated to obtain 10.8 grams of crystalline residue, melting point 40–42 degrees centigrade; this was recrystallized from hexane to obtain 5 grams (46 percent yield) of colorless crystals, melting point 44–45 degrees centigrade.

*Analysis.*—Calculated for $C_{12}H_{22}O_2S$ (percent): C, 62.60; H, 9.63; S, 13.92. Found (percent): C, 62.63; H, 9.57; S, 14.05.

(b) By displacement using sodium ethoxide: A solution of 5 grams of sodium in 200 milliliters of ethanol and 100 milliliters of tetrahydrofuran was stirred at 25–33 degrees centigrade with 21.1 grams (0.1 mole) of 2,6 - dichloro-9 - thiabicyclo[3.3.1]nonane for 8 hours, then 100 milliliters of hexane and 100 milliliters of water were added. The hexane layer was washed with water, dried over magnesium sulfate and evaporated on the steam bath to obtain 22 grams (96 percent yield) of 2,6 - diethoxy-9-thiabicyclo[3.3.1]nonane, shown by infrared to be the same product as obtained by method (a).

EXAMPLE 16

N-cyclohexylimino-9-thiabicyclo[3.3.1]nonane (hydrochloride)

A mixture of 21.1 parts of 2,6-dichloro-9-thiabicyclo-[3.3.1]nonane, 9.9 parts of cyclohexylamine, 22.3 parts of N-methylmorpholine and 50 parts of dimethoxyethane was refluxed for 20 hours, then filtered to obtain 4 parts of a colorless crystalline substance, melting point 276 degrees centigrade (decomposes), soluble in a large volume of water.

*Analysis.*—Calculated for $C_{14}H_{23}SN.HCl$ (percent): Cl, 18.8; N, 4.72; S, 10.6. Found (percent): Cl, 18.7; N, 4.7; S, 10.6.

EXAMPLE 17

2,6-dianilino-9-thiabicyclo[3.3.1]nonane

To 10.5 grams (0.05 mole) of 2,6-dichloro-9-thiabicyclo[3.3.1]nonane in 200 milliliters of ethylene glycol dimethyl ether was added 9.7 grams (0.105 mole) of aniline, and the mixture refluxed for 16 hours. The resultant solid cake was broken up, digested with 200 milliliters more of the solvent, filtered, and dried at 100 degrees centigrade to obtain 13.5 grams of solid. This was digested with excess alcoholic potassium hydroxide, then filtered, washed with methanol and water, and dried to obtain 10 grams (62 percent) of light tan crystalline solid, melting point 225–226.5 degrees centigrade, which upon repeated recrystallizations from acetone melted at 241–242 degrees centigrade.

*Analysis.*—Calculated for $C_{20}H_{22}N_2S$ (percent): N, 8.69; S, 9.87. Found (percent): N, 8.76; S, 9.76.

In like manner two molar equivalents of tridecylamine are reacted with one molar equivalent of 2,6-dichloro-9-thiabicyclo[3.3.1]nonane to obtain 2,6 - di(tridecylamino) - 9 - thiabicyclo[3.3.1]nonane as a viscous pale yellowish syrup having the correct nitrogen analysis.

In like manner, two molar equivalents of diallylamine is reacted with one molar equivalent of 2,6-dichloro-9-thiabicyclo[3.3.1]nonane to obtain 2,6-bis(diallylamino)-9-thiabicyclo[3.3.1]nonane as an almost colorless oil having the correct nitrogen analysis.

EXAMPLE 18

(Chlorophenyl)chloro-9-thiabicyclononane

To 21.1 parts of dichloro-9-thiabicyclononane in 100 parts of chlorobenzene is added 10 parts of aluminum chloride, then heated and stirred 6 hours on a steam bath. The reaction mixture was added to ice water, the organic layer washed with hydrochloric acid, filtered, and evaporated under aspirator vacuum, leaving a viscous syrup.

*Analysis.*—Calculated for $C_8H_{12}SCl(C_6H_4Cl)$ (percent): Cl, 19.5. Found (percent): Cl, 19.5.

EXAMPLE 19

Bis(trimethylammonium)-9-thiabicyclononane dichloride

A mixture of 21.1 parts of dichloro-9-thiabicyclononane, 98 parts trimethylamine and 200 parts by volume of 95 percent ethanol was stirred at room temperature for 20 hours. The precipitated solids were filtered out and air dried. The product was a colorless water-soluble solid of indefinite melting point.

*Analysis.*—Calculated for $C_{14}H_{30}SN_2Cl_2.2H_2O$ (percent): Cl (ionic), 19.4. Found (percent): Cl (ionic, by Volhard titration), 19.8.

EXAMPLE 20

2,6-diphenoxy-9-thiabicyclo[3.3.1]nonane

A solution of 20.7 parts of phenol and 8.8 parts of sodium hydroxide in 200 parts of water is stirred vigorously at reflux with a solution of 21.1 parts of 2,6-dichloro-9-thiabicyclo[3.3.1]nonane in 100 parts of methylene chloride. After 46 hours, the organic solution is separated, partially evaporated and filtered to obtain a colorless crystalline product, melting point 161 to 162 degrees centigrade.

*Analysis.*—Calculated for $C_8H_{12}S(OC_6H_5)_2$ (percent): S, 9.8. Found (percent): S, 9.9.

EXAMPLE 21

2,6-di-(p-chlorophenoxy)-9-thiabicyclo[3.3.1]nonane

The procedure of the preceding example was repeated, employing an equivalent quantity of p-chlorophenol in place of phenol. The product was a colorless solid, melting point 148 to 149 degrees centigrade.

*Analysis.*—Calculated for $C_8H_{12}S(OC_6H_4Cl)_2$ (percent): Cl, 18.0. Found (percent): Cl, 17.8.

EXAMPLE 22

2,6-diacetoxy-9-thiabicyclo[3.3.1]nonane (a) By solvolysis in acetic acid: A mixture of 42.2 grams (0.2 mole) of 2,6-dichloro-9-thiabicyclo[3.3.1]nonane and 150 milliliters of glacial acetic acid was stirred and refluxed. Evolution of hydrogen chloride proceeded vigorously at first, and was substantially complete in 14 hours. The dark solution was poured into 1 liter of water and ice, yielding an oil which solidified. The solids were filtered out and recrystallized from aqueous methanol, using clay and decolorizing charcoal, to obtain 23 grams (45 percent yield) of colorless crystals, melting point 100–101 degrees centigrade.

(b) By displacement using sodium acetate: A mixture of 105 grams (0.5 mole) of 2,6-dichloro-9-thiabicyclo[3.3.1]nonane and 98 grams (1.2 mole) of anhydrous sodium acetate in 500 milliliters of glacial acetic acid was stirred and heated on the steam bath for two hours, then cooled, filtered to remove inorganic salts, and the filtrate then poured into 2 liters of water; the precipitated solids were filtered out and washed. The product consisted of 103 grams (80 percent yield) of colorless crystals, melting point 100–101 degrees centigrade. A further 4.5 grams, melting point 99 degrees centigrade, was obtained by diluting the filtrate with water.

*Analysis.*—Calculated for $C_{12}H_{18}O_4S$ (percent): C, 55.80; H, 7.02; S, 12.39. Found (percent): C, 56.07; H, 7.01; S, 12.49.

EXAMPLE 23

2,6-dicyano-9-thiabicyclo[3.3.1]nonane

To a solution of 84.4 grams (0.4 mole) of 2,6-dichloro-9-thiabicyclo[3.3.1]nonane in 200 milliliters of N-methylpyrrolidone was added a solution of 59.0 grams (1.2 moles) of sodium cyanide in 200 milliliters of N-methylpyrrolidone at such a rate that the temperature did not exceed 70 degrees centigrade. The mixture was allowed to cool and stirred overnight, then poured into 3 liters of water and the solids removed by filtration. Recrystallization to constant melting point from benzenehexane then from ethanol yielded 25 grams (33 percent) of tan crystalline solid, melting point 157–158 degrees centigrade. The infrared spectrum showed bands at 2128 and 2222 cm.$^{-1}$ (C≡N), and no bands in the carbonyl or double bond regions.

*Analysis.*—Calculated for $C_{10}H_{12}N_2S$ (percent); C, 62.46; H, 6.29; N, 14.57; S, 16.67. Found (percent): C, 62.30; H, 6.11; N, 14.23; S, 16.46.

EXAMPLE 24

9-thiabicyclo[3.3.1]nonane-2,6-dicarboxylicacid

A mixture of 15 grams (0.078 mole) of 2,6-dicyano-9-thiabicyclo[3.3.1]nonane, 60 grams of concentrated sulfuric acid and 60 grams of water was refluxed for 1½ hours, poured into water, the solids filtered and dried to obtain 10 grams (56 percent yield) of crystalline solid, melting point 219–223 degrees centigrade, calculated neutralization equivalent 115, observed neutralization equivalent (by titration with NaOH to form the neutral sodium salt) 119. Recrystallization to constant melting point from acetic acid afforded 5 grams, melting point 237.5–8 degrees centigrade; observed neutralization equilvalent 115.

*Analysis.*—Calculated for $C_{10}H_{14}O_4S$ (percent): C, 52.16; H, 6.13; S, 13.92. Found (percent): C, 52.42; H, 6.14; S, 13.95.

EXAMPLE 25

9-thiabicyclo[3.3.1]nonane-2,6-dicarboxylic acid 9,9-dioxide

To a solution of 1.52 grams (6.7 moles) of 9-thiabicyclo[3.3.1]nonane-2,6-dicarboxylic acid in 100 milliliters of glacial acetic acid was added 1.5 grams (13 moles) of 30 percent hydrogen peroxide at 5–15 degrees centigrade, then the mixture was heated on the steam bath for 40 minutes and finally stripped to a pot temperature of 100 degrees centigrade under aspirator vacuum, leaving as residue 1.5 grams (85 percent) of white powder, melting point >245 degrees centigrade.

*Analysis.*—Calculated for $C_{10}H_{14}O_6S$ (percent): S, 12.22. Found (percent): S, 12.20.

By refluxing 9-thiabicyclo[3.3.1]nonane-2,6-dicarboxylic acid with excess thionyl chloride for one day, the diacid chloride is produced. This, dissolved in benzene and treated with an excess of ammonia gas, yields the diamide, a colorless solid melting above 250 degrees centigrade. The diacid chloride heated with excess 2-ethylhexanol at 100 degrees centigrade for one day yields the bis(2-ethylhexyl) ester of 9-thiabicyclo[3.3.1]nonane-2,6-dicarboxylic acid, a nearly colorless oil having plasticizing properties when blended with polyvinyl chloride.

EXAMPLE 26

2,6-diisothiocyano-9-thiabicyclo[3.3.1]nonane

A mixture of 1330 grams (17.5 moles) of ammonium thiocyanate, 1477 grams (7 moles) of 2,6-dichloro-9-thiabicyclo[3.3.1]nonane and 8 liters of methyl ethyl ketone was refluxed and stirred for 19 hours, then, while warm, the mixture was extracted several times with 1.5 liters of water until a negligible chloride test with silver nitrate was obtained on the washings. The solution was cooled, the precipitated solids were removed by filtration, washed with methyl ethyl ketone, and dried in air to obtain 1040 grams of slightly yellowish crystals, melting point 145–148 degrees centigrade. A second crop of 267 grams of product of the same melting point was obtained by concentrating the filtrate to 3 l. and cooling; total yield, 73 percent. Recrystallization of the analytical sample from methyl ethyl ketone raised the melting point to 149–150 degrees centigrade.

*Analysis.*—Calculated for $C_{10}H_{12}N_2S_3$ (percent): C, 46.84; H, 4.72; N, 10.93; S, 37.51. Found (percent): C, 46.71; H, 4.54; N, 11.00; S, 37.59.

EXAMPLE 27

2-chloro-6-isothiocyano-9-thiabicyclo[3.3.1]nonane

A mixture of 19.4 parts of potassium thiocyanate, 42.2 parts of dichloro-9-thiabicyclononane (Example 1), and 2600 parts of methyl ethyl ketone was refluxed for 3½ hours, then evaporated to near dryness and 400 parts of water was added. The salts dissolved, leaving a viscous organic oil. The latter was stripped free of remaining water and ketone under 10 millimeters vacuum at 100 degrees centigrade. The product is a viscous oil, which solidifies on standing.

*Analysis.*—Calculated for $C_8H_{12}SCl(NCS)$ (percent): Cl, 15.2; N, 6.0. Found (percent): Cl, 14.8; N, 5.8.

EXAMPLE 28

2-(phenylmercapto)-6-chloro-9-thiabicyclo[3.3.1]nonane

To 13 parts of sodium thiophenoxide in 100 parts of dimethylformamide is added 21 parts of 2,6-dichloro-9-thiabicyclo[3.3.1]nonane. After one day, the precipitated sodium chloride is removed by filtration. The filtrate is added to water, the mixture extracted with benzene, the benzene washed with water, dried over magnesium sulfate, and evaporated under vacuum to leave a yellow oil, partially crystalling on further standing, and having 8 percent hydrolyzable chlorine, indicating it to be the desired product in an impure state.

EXAMPLE 29

2,6-di(phenylmercapto)-9-thiabicyclo[3.3.1]nonane

To 26 parts of sodium thiophenoxide in 100 parts of dimethylformamide is added 21 parts of 2,6-dichloro-9-thiabicyclo[3.3.1]nonane. After one day, the reaction mixture is worked up as in the foregoing example, to obtain an oil and crystals. The crystals after recrystallization from hot heptane melted at 144 to 145.5 degrees centigrade.

*Analysis.*—Calculated for $C_8H_{12}S(SC_6H_5)_2$ (percent): S, 26.8. Found (percent): S, 25.0.

EXAMPLE 30

2,6-bis(p-chlorophenylmercapto)-9-thiabicyclo[3.3.1] nonane

To 10.6 parts of 2,6-dichloro-9-thiabicyclo[3.3.1]nonane in 200 parts by volume of acetone is added a solution of 28.9 parts of p-chlorothiophenol and 11.2 parts of potassium hydroxide in methyl alcohol. A mild exotherm is noted. Two hours later, the precipitated salts are filtered out. On partial evaporation of the filtrate, 14 parts of colorless solid product, melting point 81.5 to 85 degrees centigrade is obtained.

*Analysis.*—Calculated for $C_8H_{12}S(SC_6H_4Cl)$ (percent): S, 22.5. Found (percent): S, 21.7.

EXAMPLE 31

(p-Chlorophenylmercapto)chloro-9-thiabicyclo [3.3.1]nonane

The above procedure is repeated using one-half the amount of p-chlorophenylmercaptide, to obtain a yellow oil having substantially the correct chlorine analysis for (p-chlorophenylmercapto)chloro-9-thiabicyclononane.

EXAMPLE 32

2,6-diacetamido-9-thiabicyclo[3.3.1]nonane

A solution of 20 parts of 2,6-diisothiocyano-9-thiabicyclo[3.3.1]nonane in 100 parts of glacial acetic acid was refluxed for two days. The solution was then evaporated partly and allowed to stand for several days. A small amount of solid, melting point about 250 degrees centigrade, came out and was removed by filtration. Infrared analysis showed this to be an inorganic salt.

On further evaporation standing, a crystalline material came out and was found to melt at 214 degrees centigrade. Infrared analysis showed this to be the desired diacetamido-9-thiabicyclononane.

EXAMPLE 33

2-(N-methoxythiocarbonylamino)-6-isothiocyano-9-thiabicyclo[3.3.1]nonane

A solution of 20 parts of 2,6-diisothiocyano-9-thiabicyclo[3.3.1]nonane in 1000 parts of methanol is refluxed for 40 hours, then stripped free of solvent, the residue taken up in carbon disulfide and filtered. The solid thus obtained has a melting point of 183 degrees centigrade (decomposes). The infrared spectrum shows —N=C=S and —NHCO—OCH$_3$ groups.

*Analysis.*—Calculated for $C_{11}H_{16}ON_2S_3$ (percent): N, 9.15. Found (percent): N, 9.12.

EXAMPLE 34

9-thiabicyclo[3.3.1]nonane-2,6-bis(thionocarbamic acid) diethyl ester

A mixture of 20 grams (0.078 mole) of the above diisothiocyanate and 1 liter of ethanol was refluxed for 40 hours, then evaporated, the residue taken up in carbon disulfide, cooled and filtered to obtain 14 grams (51 percent) of solid product, melting point 229 degrees centigrade (decomposes); after recrystallization from methyl isobutyl ketone, the melting point was 243–244 degrees centigrade (decomposes). The infrared spectrum indicated that the isothiocyanate structure was no longer present and an —NH— band at 3.03 was evident.

*Analysis.*—Calculated for $C_{14}H_{24}O_2N_2S_3$ (percent): C, 48.24; H, 6.94; N, 8.04; S, 27.60. Found (percent): C, 49.10; H, 6.97; N, 7.72; S, 27.58.

EXAMPLE 35

N,N'-9-thiabicyclo[3.3.1]nonylene-2,6-bis(dithiocarbamic acid) sodium, zinc and manganese salts To a solution of 256 parts of 2,6-diisothiocyano-9-thiabicyclo[3.3.1]nonane in 2000 parts of tetrahydrofuran at 25 to 30 degrees centigrade is added a 20 percent aqueous solution of 112 parts of sodium sulfhydrate. The mixture is stirred for two days, briefly heated to reflux, then evaporated to remove tetrahydrofuran, the residue taken up in water and filtered to remove a small amount of insolubles. The yellow aqueous filtrate contains the disodium salt of N,N-9-thiabicyclo[3.3.1]nonylene-2,6-bis(dithiocarbamic acid), which is characterized by precipitating the insoluble manganese salt by addition of aqueous manganous sulfate and by precipitating the insoluble zinc salt by addition of aqueous zinc sulfate. The manganese salt is a tan-to-brown amorphous solid. The zinc salt is a light gray-to-tan amorphous solid. Each salt shows the correct percentage ash on ignition.

EXAMPLE 36

2,6-bis(dimethoxyphosphinothioylthio)-9-thiabicyclo[3.3.1]nonane (a) By displacement with sodium dimethyl phosphorodithiolate: To a solution of 10.45 grams (0.05 mole) 2,6-dichloro-9-thiabicyclo[3.3.1]nonane in 300 milliliters of toluene was added a mixture of 38.3 milliliters of 2.72-N dimethyl phosphorodithiolate and 100 milliliters of 1-M sodium methoxide in methanol over ½ hour at 20–25 degrees centigrade with stirring, then the mixture was refluxed ½ hour, filtered, the filtrate evaporated, the residue taken up in benzene, washed with water, dried over magnesium sulfate, evaporated, and the residue recrystallized from alcohol to obtain 17 grams (96 percent yield), melting ponit 126–128 degrees centigrade. The analytical specimen recrystallized further from benzene-heptane melted at 128–129 degrees centigrade.

*Analysis.*—Calculated for $C_{12}H_{24}O_4P_2S_5$ (percent): S, 35.26; P, 13.63. Found (percent): S, 35.76; P, 13.6.

(b) By displacement of chloride by dimethyl phosphorodithiolate: A solution of 100 grams (0.47 mole) of 2,6-dichloro-9-thiabicyclo[3.3.1]nonane in 360 milliliters of 2.83-N dimethyl phosphorodithiolate in toluene was heated on the steam bath for 6 hours, during which time 0.92 mole of hydrogen chloride was evolved. On cooling and standing, solids came out which were removed by filtration and recrystallized from benzene-heptane to obtain 180 grams of colorless crystals, melting point 125–128 degrees centigrade, found by infrared to be the same as the product of method (a).

(c) By displacement of methoxy groups: A solution of 4.0 grams (0.02 mole) of 2,6-dimethoxy-9-thiabicyclo[3.3.1]nonane and 6.3 grams (0.04 mole) of dimethyl phosphorodithiolate in 40 milliliters of toluene was refluxed for 12 hours, then evaporated on the steam bath under aspirator vacuum to obtain a nearly quantitative yield of colorless solid, identified by infrared as the same compound as made by methods (a) or (b).

EXAMPLE 37

2,6-bis(diethoxyphosphinothioylthio)-9-thiabicyclo[3.3.1]nonane (a) By displacement with sodium diethyl phosphorodithiolate: The procedure and reactant quantities were similar to method (a) employed for the methyl ester, giving 22.6 grams (88 percent yield) of nearly colorless product, melting point 54–57 degrees centigrade (from alcohol). Recrystallization from heptane raised the melting point to 60–61 degrees centigrade.

*Analysis.*—Calculated for $C_{16}H_{32}O_4P_2S_5$ (percent): C, 37.62; H, 6.32; P, 12.13; S, 31.39. Found (percent): C, 37.53; H, 6.31; P, 12.2; S, 31.4.

EXAMPLE 38

Preparation of O,O-diethyl 6-chloro-9-thiabicyclo[3.3.1]-2-nonyl phosphorodithioate A solution of 42.2 parts of 2,6-dichloro-9-thiabicyclo[3.3.1]nonane, 36 parts of sodium O,O-diethyl phosphorodithiolate and 21 parts of triethylamine in 180 parts of benzene was refluxed for 10 hours, cooled, filtered to remove triethylamine hydrochloride, and the benzene evaporated off to obtain the product as a reddish syrup.

*Analysis.*—Calculated for $C_{12}H_{22}O_2ClPS_3$ (percent): Cl, 9.8. Found (percent): Cl, 9.0.

EXAMPLE 39

Preparation of O,O-diethyl ethylmercapto-9-thiobicyclo[3.3.1]nonyl phosphorodithioate The product of the preceding example (18 parts), 3.5 parts of ethyl mercaptan, and 3.1 parts of sodium methoxide was stirred in 50 parts of dimethylformamide for 10 hours, then diluted with several volumes of water. The oil which separated was extracted with benzene, the extracts washed with water, and stripped free of benzene to leave the desired product as a reddish-brown oil, free of chlorine.

An analogous methylmercapto compound was prepared using methylmercaptan in place of ethylmercaptan in the above procedure.

EXAMPLE 40

9-thiobicyclo[3.3.1]nonane-2,6-dithiol bis(N,N-dimethyldithiocarbamate)

A mixture of 21.1 grams (0.1 mole) of 2,6-dichloro-9-thiabicyclononane, 70.6 grams of 40.97 percent aqueous solution of sodium dimethyldithiocarbamate and 50 milliliters of water was stirred on the steam bath for one hour, then cooled and filtered to obtain 38 grams of crude product having an unsharp melting point at 193 degrees centigrade. This product was recrystallized from benzene-heptane to obtain 19 grams of yellowish crystals, melting point 210–211 degrees centigrade.

*Analysis.*—Calculated for $C_{14}H_{24}N_2S_5$ (percent): C, 44.17; H, 6.35; N, 7.36; S, 42.11. Found (percent): C, 44.25; H, 6.26; N, 6.9; S, 41.93.

In analogous ways, the bis-N,N-diethyl,
bis-N,N-dibutyl-,
bis-N,N-diisopropyl-,
bis-N-methyldithiocarbamate,
bis(N,N-diethylthiocarbamate)-,
bis(N,N-di-n-propylthiocarbamate)-,
bis(N,N-diisopropylthiocarbamate)-,
mono-(N,N-diethyldithiocarbamate)-monochloro-, and
mono-(N,N-diethylthiocarbamate)-monomethoxy-9-thiabicyclononanes were made.

EXAMPLE 41

2,6-bis(methylthio)-9-thiabicyclo[3.3.1]nonane 9,9-dioxide

To a solution of 8 grams (0.17 mole) of methyl mercaptan in 75 milliliters of dimethylformamide was added 4.5 grams (0.083 mole) of sodium methylate, then 10 grams (0.041 mole) of 2,6-dichloro-9-thiabicyclo[3.3.1]nonane 9,9-dioxide and the mixture heated in a sealed tube for 8 hours at 150 degrees centigrade. The mixture was cooled, filtered, and the filtrate evaporated to dryness. The residue was recrystallized twice from benzene to obtain 5 grams (46 percent) of a colorless solid, melting point 176.5–177 degrees centigrade.

*Analysis.*—Calculated for $C_{10}H_{18}O_2S_3$ (percent): C, 45.08; H, 6.81; S, 36.10; Cl, 0.0. Found (percent): C, 44.87; H, 6.73; S, 35.63; Cl, 0.5.

EXAMPLE 42

Preparation of 2,6-dimercapto-9-thiabicyclo[3.3.1]nonane

Ten parts of the bis(dimethyldithiocarbamate) of the preceding example and 10 parts of sodium hydroxide are refluxed in a 3:1 water-alcohol mixture for one week under nitrogen. The solution is diluted with water, cooled, and then acidified by addition of dilute aqueous hydrochloric acid, and the precipitated oil extracted by benzene. Upon stripping of the benzene, the dithiol was obtained as an amber gum.

EXAMPLE 43

6-chloro-9-thiabicyclo[3.3.1]-2-nonene 2,6-dichloro-9-thiabicyclo[3.3.1]nonane (211 grams, 1 mole) was melted and held at 166–184 degrees centigrade with a slow nitrogen purge until one mole of hydrogen chloride had been collected in a water filled trap attached to the reactor outlet, this requiring 20 hours. The residual liquid was then distilled through a short packed column to obtain 148 grams (85 percent) of colorless liquid, boiling point 64–69 degrees centigrade (0.3 millimeter), $N_D^{25}$ 1.5713.

*Analysis.*—Calculated for $C_8H_{11}ClS$ (percent): S, 18.35; Cl, 20.3 (molecular weight 174.7). Found (percent): S, 18.29; Cl, 19.9 (molecular weight 179 (by boiling point elevation in tetrahydrofuran)).

EXAMPLE 44

6-chloro-9-thiabicyclo[3.3.1]-2-nonene 9,9-dioxide

To a solution of 52.5 grams (0.3 mole) of 6-chloro-9-thiabicyclo[3.3.1]-2-nonene in 300 milliliters of glacial acetic acid was added 85.2 grams (0.75 mole) of 30 percent hydrogen peroxide over 20 minutes, with stirring, allowing the temperature to rise to the boiling point. The mixture was then heated at the steam bath for 20 minutes, added to 3 liters of water, and extracted with 400 milliliters of chloroform. The extracts were dried over magnesium sulfate, filtered, evaporated to remove the chloroform, and the residue recrystallized from acetic acid to obtain 38 grams of colorless crystals, melting point 114–116 degrees centigrade. Recrystallization from acetic acid afforded 34 grams (55 percent yield), melting point 119–120 degrees centigrade; from methanol, 120.5–121.5 degrees centigrade. The infrared spectrum (Nujol mull) showed a C=C band at 1646 cm.$^{-1}$ and —$SO_2$— bands at 1119 and 1297 cm.$^{-1}$.

*Analysis.*—Calculated for $C_8H_{11}O_2ClS$ (percent): C, 46.48; H, 5.36; Cl, 17.16; S, 15.51. Found (percent): C, 46.52; H, 5.33; Cl, 17.20; S, 15.47.

EXAMPLE 45

2-chloro-9-thiabicyclo[3.3.1]nonane 9,9-dioxide

A solution of 8 grams (0.039 mole) of 6-chloro-9-thiabicyclo[3.3.1]-2-nonene 9,9-dioxide in 150 milliliters of isopropanol plus 20 milliliters of dioxane was hydrogenated over 1 gram of Raney nickel in a Parr shaker apparatus for 24 hours at 70 pounds per square inch gauge initial pressure. The catalyst was filtered out, the solvent evaporated, and the residue recrystallized from benzene-cyclohexane, then twice from aqueous methanol to obtain colorless crystals, melting point 186–187.5 degrees centigrade, giving a negative Baeyer test for unsaturation.

*Analysis.*—Calculated for $C_8H_{13}O_2ClS$ (percent): C, 46.04; H, 6.28; Cl, 16.99; S, 15.36. Found (percent): C, 45.90; H, 6.29; Cl, 16.80; S, 15.31.

Volhard titration of an aliquot of the reaction mixture prior to work-up showed no chloride ion to be present, indicating no hydrogenolysis had occurred.

EXAMPLE 46

9-thiabicyclo[3.3.1]-6-nonen-2-ol

To a mixture of 52.5 grams (0.3 mole) of 6-chloro-9-thiabicyclo[3.3.1]-6-nonene (0.3 mole) in 100 milliliters of ethylene glycol dimethyl ether was added 120 grams of 10 percent aqueous sodium hydroxide (0.3 mole), then the mixture was stirred and heated at reflux for 24 hours. The mixture was then evaporated on the steam bath until the upper (organic layer) had disappeared, and the precipitated solids were then filtered out to obtain 44 grams of crude product. This product was recrystallized from hot water (discarding insoluble material) to obtain 32 grams (68 percent yield) of colorless microcrystalline product, melting point 176–177 degrees centigrade. The infrared spectrum of a 0.003 molar solution in carbon tetrachloride showed a single sharp band at 3621 cm.$^{-1}$ in the OH stretching region.

*Analysis.*—Calculated for $C_8H_{12}OS$ (percent): C, 61.50; H, 7.74; S, 20.52. Found (percent): C, 61.65 H, 7.68; S, 20.49.

The same product was obtained by saponification of the acetate using aqueous sodium hydroxide at 90–100 degrees centigrade.

EXAMPLE 47

9-thiabicyclo[3.3.1]-6-nonen-2-ol 9,9-dioxide

To 1.60 grams (0.0103 mole) of 9-thiabicyclo[3.3.1]-6-nonen-2-ol in 30 milliliters of glacial acetic acid at 10 degrees centigrade was added 2.7 grams of 30 percent hydrogen peroxide. After two hours at 10–25 degrees centigrade, the mixture was warmed at 80 degrees centigrade for 40 minutes, then evaporated to dryness and the residue recrystallized from ethyl acetate to obtain 0.9 gram (47 percent yield) of colorless solid, melting point 261–262 degrees centigrade. The infrared spectrum showed —SO$_2$— bands at 1120 and 1280 (broad), a C=C stretching band at 1648 and unsaturated C—H stretching band at 3030 cm.$^{-1}$.

*Analysis.*—Calculated for C$_8$H$_{12}$O$_3$S (percent): C, 51.04; H, 6.43; S, 17.03. Found (percent): C, 52.11; H, 6.55; S, 16.91.

EXAMPLE 48

9-thiabicyclo[3.3.1]nonan-2-ol 9,9-dioxide

A solution of 0.48 gram (2.5 moles) of 9-thiabicyclo[3.3.1]-6-nonen-2-ol 9,9-dioxide in 20 milliliters of isopropanol was hydrogenated at 40 pounds per square inch over 1.6 grams of Raney nickel catalyst (charged in two portions over two days), the mixture filtered, evaporated to dryness, and the residue recrystallized to obtain 0.22 gram (46 percent yield) of colorless solid, melting point 329–330 degrees centigrade. The infrared spectrum showed the absence of C=C or olefinic C-H absorption.

*Analysis.*—Calculated for C$_8$H$_{14}$O$_3$S (percent): C, 50.51; H, 7.42; S, 16.85. Found (percent): C, 50.24; H, 7.74.

EXAMPLE 49

6-methoxy-9-thiabicyclo[3.3.1]-2-nonene (a) By use of sodium methoxide: A solution of 120 grams (0.7 mole) of 6-chloro-9-thiabicyclo[3.3.1]-2-nonene and 41.3 grams (0.76 mole) of sodium methylate in 200 milliliters of methanol was refluxed for fifteen minutes, cooled, filtered to remove salt, the alcohol distilled off, and the residual oil distilled through a 6 inch Vigreux column to obtain 80 grams (67 percent yield) of colorless liquid, boiling point 133–137 degrees centigrade (13 millimeters), N$_{24.5}$$^D$ 1.5379.

*Analysis.*—Calculated for C$_9$H$_{14}$OS (percent): C, 63.48; H, 8.29; S, 18.83. Found (percent): C, 62.84; H, 8.31; S. 18.53.

(b) By methanolysis in the absence of base: A solution of 21.1 grams (0.1 mole) of 6-chloro-9-thiabicyclo[3.3.1]-2-nonene and 100 milliliters of methanol was refluxed for 12 hours, then partitioned between 100 milliliters of hexane and 100 milliliters of water, the hexane layer washed with water, dried over magnesium sulfate, and evaporated on the steam bath to obtain as residue 16 grams of colorless oil, shown by infrared to be almost pure 6-methoxy-9-thiabicyclo[3.3.1]-2-nonene.

EXAMPLE 50

6-methoxy-9-thiabicyclo[3.3.1]-2-nonene 9,9-dioxide

To a solution of 6-methoxy-9-thiabicyclo[3.3.1]-2-nonene (17 grams, 0.1 mole) in 50 milliliters of glacial acetic acid was added 0.22 mole of 30 percent hydrogen peroxide over one-half hour with cooling at 20–35 degrees centigrade. After 2 hours, the temperature was raised to 95–100 degrees centigrade and held for 2 hours, the solution was then evaporated on the steam bath under aspirator vacuum to obtain 19.6 grams of waxy residue which upon recrystallization from benzene-hexane mixture gave 14 grams of colorless solid, melting point 81.5–82.5 degrees centigrade.

*Analysis.*—Calculated for C$_9$H$_{14}$O$_3$S (percent): C, 53.44; H, 6.98; S, 15.85. Found (percent): S, 15.95.

EXAMPLE 51

2-methoxy-9-thiabicyclo[3.3.1]nonane 9,9-dioxide

A solution of 140 milligrams of 6-methoxy-9-thiabicyclo[3.3.1]-2-nonene 9,9-dioxide in 11 milliliters of isopropanol was hydrogenated at 35 pounds per square inch gauge over 0.3 gram of Raney nickel catalyst for 48 hours, then mixture centrifuged to remove catalyst, and the solvent evaporated to obtain 140 milligrams of colorless soild, melting point 106–106.5 degrees centigrade.

*Analysis.*—Calculated for C$_9$H$_{16}$O$_3$S (percent): C, 52.91; H, 7.90; S, 15.69. Found (percent): C, 52.78; H, 7.93; S, 15.89.

EXAMPLE 52

Preparation of O,O-diethyl S-(dichloro-9-thiabicyclo[3.3.1]nonyl)phosphorothioate To 148 parts of 6-chloro-9-thiabicyclo[3.3.1]-2-nonene in 500 parts of benzene is added an equal weight (148 parts) of diethoxyphosphinylsulfenyl chloride and the mixture refluxed overnight, then evaporated under aspirator vacuum to obtain an oil. Examination by infrared shows that the double bond absorption band is absent, indicating that the addition of the sulfenyl chloride to the double bond is complete.

EXAMPLE 53

Preparation of higher chlorination products of 2,6-dichloro-9-thiabicyclo[3.3.1]nonane 105.5 parts of 2,6-dichloro-9-thiabicyclo[3.3.1]nonane was dissolved in 2000 parts of carbon tetrachloride and chlorine gas passed in at reflux under illumination by a mercury vapor lamp. Samples were removed as successive molar amounts of hydrogen chloride were collected in a trap, and the samples were evaporated under vacuum to remove the solvent. Amorphous solids were thus obtained having increasing amounts of chlorine.

| Example No. | Percent Cl found | Theory for nearest integral number of chlorines |
| --- | --- | --- |
| 53 | 43.2 | 3 Cl:43.3 |
| 53 | 49.5 | 4 Cl:50.7 |
| 53 | 57.6 | 5 Cl:56.4 |
| 53 | 60.3 | 6 Cl:61.0 |
| 53 | 65.1 | 7 Cl:64.5 |

In general, the compounds of the invention have fungicidal activity, some of them being outstandingly active and superior to prior art fungicides in this respect. They also have utility as herbicides, insecticides, miticides, bacteriostats, nematocides, and as chemical intermediates. The bifunctional diols, dithiols, diesters, dicarboxylic acids, hydroxy acids, amino acids, diisocyanates and diisothiocyanates of the invention are useful for polymerization to polyesters, polyamides, polythiolesters and polythioamides.

Tests for pesticidal activity were carried out as follows: (a) against early blight disease—tomato plants inoculated with spores of *Alternaria solani* were sprayed with aqueous dispersions of the test chemical. After 10 days, the percent repression of leaf lesions relative to unsprayed inoculated plants was determined; (b) against Pythium—soil infested with Pythium was admixed with the test chemical at 64 p.p.m. and peas planted therein. The percent emergence of seedlings in the treated soil is estimated, relative to emergence in untreated infested soil; (c) against nematodes—soil infested with *Meloidogyne incognita* var. *acrita* was admixed with the test chemical at 147 p.p.m. Then, cucumber seedlings were planted therein. Ten days later the seedlings were uprooted and the percentage repression of root lesions (root "knots") relative to untreated controls was estimated; (d) bacteriostatic effects—nutrient agar was admixed with the test chemical at 0.01 percent and inoculated with *Staphylococcus aureus* and *Escherichia coli*. Failure of bacterial colonies to develop was rated as positive evidence of bacteriostatic effects.

TABLE I.—PESTICIDAL ACTIVITY OF 9-THIABICYCLONONANES OF STRUCTURE INDICATED BELOW

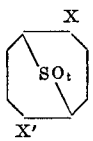

| Example No. | X | X' | t | Early blight control, 400 p.p.m. | Percent Pythium control, 64 p.p.m. | Percent nematode control, 147 p.p.m. | Bacteriostatic effect S. aureus | Bacteriostatic effect E. coli |
|---|---|---|---|---|---|---|---|---|
| 54 | Cl | Cl | 0 | | 30 | | + | |
| 55 | Br | Br | 0 | 35 | 20 | | | |
| 56 | I | I | 0 | 49 | 30 | | | |
| 57 | Cl | Cl | 1 | 63 | | 100 | | |
| 58 | Cl | Cl | 2 | 77 | | 90 | | |
| 59 | —NCS | —NCS | 0 | 100 | | | | |
| 60 | —NCS | Cl | 0 | 99 | | | + | |
| 61 | CN | CN | 0 | 71 | | 50 | | |
| 62 | $OC_6H_5$ | $OC_6H_5$ | 0 | | 40 | | | |
| 63 | $OC_6H_4Cl$-p | $OC_6H_4Cl$-p | 0 | | 30 | | | |
| 64 | $SC_6H_5$ | $SC_6H_5$ | 0 | | | | + | |
| 65 | $C_6H_5$ | $C_6H_5$ | 0 | 64 | | | + | |
| 66 | $C_6H_4Cl$ | Cl | 0 | 70 | | | + | |
| 67 | $NHC_6H_5$ | $NHC_6H_5$ | 0 | | 50 | | | |
| 68 | —NCS | —NCS | 2 | 61 | | | + | |
| 69 | $C_6H_5$ | Cl | 0 | 64 | 30 | | + | |
| 70 | $C_6H_4Cl$ | Cl | 0 | 70 | 30 | | | |
| 71 | $SPS(OC_2H_5)_2$ | Cl | 0 | 89 | 20 | | + | |
| 72 | $SPS(OC_2H_5)_2$ | $SPS(OC_2H_5)_2$ | 0 | 37 | 10 | | | |
| 73 | OH | OH | 2 | 85 | 10 | | | + |
| 74 | $OCH_2CH_2CL$ | Cl | 0 | 38 | | | + | |
| 75 | $NHCSOCH_3$ | —NCS | 0 | 100 | | | | |
| 76 | $NHCSOCH_3$ | $NHCSOCH_3$ | 0 | 100 | | | | |
| 77 | NHCSSNa | NHCSSNa | 0 | 100 | | | | |
| 78 | $NHCSSZn½$ | $NHCSSZn½$ | 0 | 100 | | | | |
| 79 | $NHCSSMn½$ | $NHCSSMn½$ | 0 | 100 | | | | |
| 80 | SH | SH | 0 | 90 | | | | |

EXAMPLE 81

Insecticidal activity

Various of the compounds of the invention were sprayed in 0.1 percent aqueous dispersions onto houseflies, aphids, and mites (*Tetranychus atlanticus*). Within 5 days, the percent mortality (corrected for any mortality in untreated control populations) was estimated, with the results shown in Table II.

TABLE II.—INSECTICIDAL ACTIVITY

| | Percent kill of indicated species at 0.1 percent concentration | | |
|---|---|---|---|
| | Houseflies | Aphids | Mites |
| 2,6-bis(dimethoxyphosphinothioylthio)-9-thiabicyclo[3,3,1]nonane 9-oxide | | 100 | 100 |
| O,O-diethyl S-(6-chloro-9-thiabicyclo[3.3.1]non-2-yl)phosphorodithioate | | | 100 |
| 2,6-dianilino-9-thiabicyclo[3.3.1] nonane | 84 | 70 | 67 |
| 2,6-di(phenylmercapto)-9-thiabicyclo[3.3.1]nonane | | | 75 |
| 2-(p-chlorophenylmercapto)-6-hydroxy-9-thiabicyclo[3.3.1]nonane | | | 100 |
| 2,6-bis(trimethylammonium)-9-thiabicyclo[3.3.1]nonane dichloride | | 98 | |
| 2,6-difluoro-9-thiabicyclo[3.3.1]nonane | | *100 | |

*Systemic activity. Chemical applied to soil in which aphid-infested nasturtiums were growing.

EXAMPLE 82

Herbicidal activity

Various of the chemicals of the invention are applied pre-emergence at the ratio of 8 pounds per acre to greenhouse flats seeded with representative weed species, specifically buttonweed (Abutilon) and millet. After 2 weeks, the degree of seedling growth repression is observed (— =no effect, +=moderate repression, ++=severe repression or kill).

TABLE III.—HERBICIDAL EFFECTS

[The compounds employed have the same skeleton as those of Examples 59–80, the substituents, X, X' and t being indicated below]

| X | X' | t | Repression of weed species Buttonweed | Repression of weed species Millet |
|---|---|---|---|---|
| $CH_3O$— | —$NHCON(CH_3)_2$ | 0 | ++ | ++ |
| H | —$NHCON(CH_3)_2$ | 0 | ++ | ++ |
| HO— | —S(C=S)N($C_2H_5$)$_2$ | 0 | — | + |
| Cl | —S(C=S)N($C_2H_5$)$_2$ | 0 | — | + |
| $CH_3O$ | —S(C=S)N($C_2H_5$)$_2$ | 0 | — | + |
| $OCOCCL_2CH_3$ | $OCOCCl_2CH_3$ | 0 | + | ++ |
| $OCOCCL_3$ | $OCOCCl_3$ | 0 | + | ++ |

EXAMPLE 83

Formulation of emulsifiable concentrate

The following ingredients are blended:

O,O-dimethyl S-(6-hydroxy-9-thiabicyclo[3.3.1]non-2-yl) phosphorodithioate—1 lb.
Emulsifier (blend of polyoxyethylene ether and calcium alkylaryl sulfonate)—0.3 lb.
Solvent (1:3 mixture isophorone-xylene)—to 1 gal.

The resultant solution is emulsifiable with water to prepare a miticidal spray.

EXAMPLE 84

Formulation of wettable powder

The following ingredients are mixed and ground in an air mill:

| | Parts by wt. |
|---|---|
| 2,6-diisothiocyano-9-thiabicyclo[3.3.1]nonane | 50 |
| Attapulgus clay ("Attaclay") | 43 |
| Lignosulfonate dispersing agent ("Marasperse N") | 4 |
| Sodium alkylnaphthalene sulfonate wetting agent ("Sorbit P") | 3 |

The resultant powder is suitable for dispersal in water for use as a fungicidal spray.

EXAMPLE 85

Formulation of dust

The following ingredients are mixed and ground in a hammer mill:

| | Parts by wt. |
|---|---|
| 2,6-di(thiocarbamido)-9-thiabicyclo[3.3.1] nonane | 5 |
| Pyrophyllite clay | 95 |

The resultant dust is suitable for fungicidal application.

In general, when the compounds of the present invention are employed as pesticides, they will be applied at rates ranging from between about 0.05–100 pounds per acre, the amount depending on crop resistivity, weather conditions and other factors known to those skilled in the art.

While the compounds of the instant invention may be utilized as pesticides in the pure form, they may be conveniently employed in the form of formulations which, in many instances, enhance pesticidal activity. Suitable formulations include solutions of the pesticide composition in a solvent such as petroleum hydrocarbons, i.e., xylene, heavy aromatic naphthas and the like, aqueous dispersions or emulsions generally containing surface active agents such as those listed in "Soap and Chemical Specialities," volume 31, No. 7, pages 50–61; No. 8, pages 48–61; No. 9, pages 52–63; and No. 10, pages 38–67 (1955). Also useful are solid formulations of the compounds of the instant invention. For example, solid carriers such as talc, clay, silica, vermiculite and the like may be utilized in the formulations. The solid formulation may also contain surface active agents, sticking agents, stabilizing agents or binders to facilitate their application.

The compounds of the instant invention may further be formulated with other pesticides, e.g., other fungicides such as sulfur, the fungicidal dithiocarbamates, dodecylguanidine, nitropolychlorobenzenes and various fungicidal compositions containing chlorinated alkylthio groups such as captan. Further, the compounds of the present invention may be formulated with insecticides such as the chlorinated hydrocarbon insecticides, the phosphate insecticides and the carbamate insecticides, and with herbicides such as sodium chlorate, sodium borate, 2,4-D the herbicidal triazines, herbicidal ureas and the herbicidal uracils.

Further, the compounds of the present invention may be formulated with synergists that serve to enhance the pesticidals activity; for example, piperonyl butoxide and the like. It is, of course, appreciated that any pesticidal composition may be used in combination with the compounds of the present invention which may serve to enhance, complement, or synergize said compounds.

EXAMPLE 86

Soil heavily infested with Frusarium was treated with 64 pounds per acre of 7,8-dichloro-9-thiabicyclo[4.2.1] nonane and three days later tomato seedlings were transplanted therein. After 15 days, the plants were found to be healthy whereas comparison plants in similarly infested but untreated soil were in a moribund condition because of Fusarium wilt disease.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principles may be utilized.

What is claimed is:

1. The compound

2. The compound

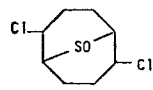

3. The compound

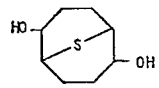

4. The compound

5. The compound

6. The compound

7. The compound

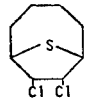

8. The compound

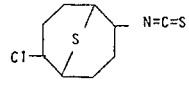

9. A process for the preparation of a compound of the formula

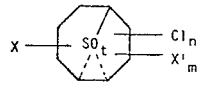

whereinX and X' are chlorine located $\beta$ and $\beta'$ to the sulfur, $n$ is a number from 0 to 12, $t$ is a number from 0–2, and $m$ is a number from 0 to 1, comprising:
 (a) contacting cyclooctadiene with sulfur chloride;
 (b) where $n$ is a number greater than zero, subjecting the adduct produced by step (a) to chlorination by introduction of at least $n$ molar equivalents of chlorinating agent; and
 (c) less where $t$ is a number greater than 0:
  (1) where $n$ is 0, subjecting the adduct produced by step (a) to $t$ molar equivalents of a sulfur-oxidizing agent; and
  (2) where $n$ is greater than 0, subjecting the adduct produced by step (b) to $t$ molar equivalents of a sulfur-oxidizing agent.

10. The process of claim 9 wherein 1,5-cyclooctadiene is employed.

11. The process of claim 9 wherein 1,3-cyclooctadiene is employed.

12. The process of claim 9 wherein sulfur dichloride is employed.

References Cited

Smith, Open-Chain N-Cpds. (Benjamin, N.Y., 1965) vol. I, pp. 244–8.

HENRY R. JILES, Primary Examiner

C. M. SHURKO, Assistant Examiner

U.S. Cl. X.R.

71—90, 91; 204—158; 260—79.7, 329 S, 329 F, 329 ME, 332.1, 332.2 C, 332.3 P, 332.5

PO-1050
(5/69)

UNITED STATES PATENT OFFICE
CERTIFICATE OF CORRECTION

Patent No. 3,644,415     Dated February 22, 1972

Inventor(s)  Edward D. Weil and Keith J. Smith

It is certified that error appears in the above-identified patent and that said Letters Patent are hereby corrected as shown below:

Col. 1, line 19 "contnuation" should read ---continuation---.
Col. 2, line 55, before "the compounds" insert ---wherein n, t, X and X' are as defined above---. Col. 5, line 5, "diffuoro" should read ---difluoro ---; line 7, "The" should read ---These---; line 47, "wherein R' " should read ---where the R'---. Col. 6, line 16, before "2" insert ---(---; line 49, "di-laurylmercapto)" should read ---di(laurylmercapto)---; Col. 9, line 57 "-dimethylcarbamino" should read --- -dimethylcarbamido---.
Col. 10, line 5 "clano-" should read ---cyano- ---; line 6, "C$_8$H$_{12}$S(NCS-OCH)" should read ---C$_8$H$_{12}$S(NCS)(NHCS-OCH$_2$)---; Col. 11, line 15, "2,6-ichloro" should read ---2,6-dichloro---; line 51, "benzene))" should read ---benzene) ---; line 66, "heptane" should read ---heptene--. Col. 18, line 31 "crystallin should read ---crystallizing---. Col. 20, line 4 "ponit" should read --- point---; line 57, and line 72 each occurrence, "thiobicyclo" should read ---thiabicyclo---. Col. 23, line 22, "7.74" should read ---7.47---; line 59, "obtaind" should read ---obtain---; line 75, "soild" should read ---solid---.
Col. 25 in Table 1, Example No. 66 "Cll" should read ---Cl---; idem Example 74 "OCH$_2$CH$_2$CL" should read ---OCH$_2$CH$_2$Cl---. Col. 26, in Table III, in Col. X', items 3,4, and 5, each occurrence, "S(C≡S)N(C$_2$H$_5$)$_2$" should read ---S(C=S)N(C$_2$H$_5$)$_2$---; Col. 26, in Table III, in column X, items 6 and 7, that portion of the formulas in each instance reading "CL" should read ---Cl---. Claim 9, line 44, "whereinX" should read ---wherein X---; line 52, delete "less".

Signed and sealed this 29th day of August 1972.

(SEAL)
Attest:

EDWARD M. FLETCHER, JR.
Attesting Officer

ROBERT GOTTSCHALK
Commissioner of Patents